(12) United States Patent　　(10) Patent No.:　　US 6,317,079 B1
Shannon　　(45) Date of Patent:　　Nov. 13, 2001

(54) SYSTEM FOR ASCERTAINING HEIGHT AS RELATED TO AN ESTABLISHED REFERENCE

(75) Inventor: Brian F. Shannon, Fairfax, VA (US)

(73) Assignee: U.S. Army Corps of Engineers as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/551,860

(22) Filed: Apr. 18, 2000

(51) Int. Cl.[7] .................................................. H04B 7/185
(52) U.S. Cl. .................. 342/357.09; 342/357.1; 342/357.08; 701/215
(58) Field of Search .................. 342/357.08, 357.09, 342/357.1; 701/215

(56) References Cited

U.S. PATENT DOCUMENTS

| 3,432,851 | 3/1969 | Cox ........................................ 343/6.5 |
| 4,259,734 | 3/1981 | Harmel ................................. 367/101 |
| 5,202,829 | * | 4/1993 | Geier . |
| 5,491,636 | * | 2/1996 | Robertson et al. . |
| 5,497,356 | 3/1996 | Norton, Jr. et al. ..................... 367/6 |
| 5,689,475 | * | 11/1997 | Chaumet-Lagrange ................ 367/99 |
| 6,185,504 | * | 2/2001 | Berstis et al. ........................ 701/213 |

OTHER PUBLICATIONS

International Symposium on Marine Positioning, INSMAP pp. 432–441, inclusive Nov. 30–Dec. 4, 1998.

* cited by examiner

Primary Examiner—Theodore M. Blum
(74) Attorney, Agent, or Firm—Earl H. Baugher, Jr.

(57) ABSTRACT

A preferred embodiment permits the safe navigation of a channel or harbor by a ship. A preferred embodiment includes a ship-borne system having a first global positioning system (GPS) receiver and a second fixed reference station with a GPS receiver. Both GPS receivers have GPS signal receiving antennas. Earth orbiting satellites of the GPS maintain communication at both locations via the two receive antennas. A broadcast radio transmitter at the reference station transmits a received GPS signal to the ship-based GPS antenna for receipt by the ship's separate radio receiver and processing by a computer. Using known navigation chart information on the water depths within a body of water, channel or harbor, known marine surveyor data, including the phase center of the ship-borne GPS receive antenna, and the two separately received GPS signals, the ship's keel clearance referenced to a known chart datum is calculated at one second intervals.

12 Claims, 5 Drawing Sheets

SYSTEM FOR ASCERTAINING HEIGHT AS RELATED TO AN ESTABLISHED REFERENCE

BACKGROUND OF THE INVENTION

This invention relates to a system that permits an operator to safely navigate a vessel in a water channel or harbor by using the Global Positioning System (GPS). The GPS is used to determine position (3-dimensionally) on earth by using a set of 24 geo-synchronous, earth-orbiting satellites broadcasting precisely timed signals. A GPS signal receiver (or GPS receiver) on earth is able to simultaneously read transmissions from at least four of these satellites to determine global latitude, longitude, time and elevation. The most widespread use, and the purpose of the GPS creation, is global navigation. Inexpensive GPS signal receivers are capable of providing one's location to within about 300 feet horizontally and 50 feet vertically. Greater accuracies are currently disabled or non-military receivers by the U.S. Department of Defense.

To obtain the water depth while on a ship, various types of Instruments and systems have been used to inform personnel of the water depth in channel and harbors. One common method is to rely on previously made measurements from the keel to the bathymetry (sea bottom topography). However, in doing so it must be recognized that the bathymetry changes with sediment transport from upland rainfall, runoff and shifting sand from long shore transport and coastal storms. As a result the previous measurements may not reflect the true conditions at the time the operator is in the channel.

Another prior art patented system discloses a signal processor which receives signals from an array of transponders to determine and record ranges to specific transponders, with the information received being recorded in a computer which transfers the information to a visual display.

With another prior art system used to measure ocean depths, acoustical sounding from a ship is used with pulses of different frequencies. The echoes are received at the ship and sorted by specific frequency. By doing so the user is assured that the determination of the transit time of a pulse of one frequency is not confused by the receipt of an echo at another frequency.

Still another prior art system discloses a system for locating a bottom cable which uses transponders connected to the cable and a master transponder which broadcasts an interrogation pulse from each transponder. Slave transponders send encoded signals to the master transponder and the time between the pulses is measured to constitute a range measurement to the slave transponder.

DESCRIPTION OF THE PRIOR ART

System used to provide for the on board measurement of water depth are known. For example, in the U.S. Pat. No. 3,432,851 to Cox, Jr. et al. there is disclosed a system with a signal processor which receives signals from an array of transponders to determine and record ranges to specific transponders, with the information received being recorded in a computer which transfers the information to a visual display.

U.S. Pat. No. 4,259,734 to Harmel discloses a system used to measure ocean depths with acoustical sounding from a ship using pulses of different frequencies. The echoes from these pulses are received at the ship and sorted by specific frequency. By doing so, the user is assured that the determination of the transit time of a pulse of one frequency is not confused by the receipt of an echo at another frequency.

U.S. Pat. No. 5,497,356 to Norton, Jr. et al. discloses a system for locating a bottom cable which uses transponders connected to the cable and a master transponder which broadcasts an interrogation pulse from each transponder. Slave transponders send encoded signals to the master transponder and the time between pulses is measured to constitute a range measurement to the slave transponder.

In a preferred embodiment of the present invention a Global Positioning System (GPS) reference signal receiving station located on land broadcasts information to a ship with its own GPS signal receiver system. Using the information from the reference station and the information on the ship, a level position of the ship can be computed. This allows the determination of keel clearance relative to the published channel template in lieu of a reference to the bathymetry. An on board computer, using a interpolated channel grid, is able to compute the height at a given position, using predetermined ellipsoid height tidal measurements, that are adjusted by subtracting the distance from the phase center of the onboard GPS antenna to on the bottom of the keel as is detailed in the following.

SUMMARY OF THE INVENTION

A preferred embodiment of the present invention relates to a system to permit the navigation of a channel or harbor having a reference GPS signal receiving station that sends information to a ship with its GPS signal receiving system.

It is an object of the present invention to provide for a system to determine height relative to a reference.

Another object is to provide for such a system in which the GPS systems at a reference position and on a ship are used with a computer to calculate the desired result.

Figure 1:
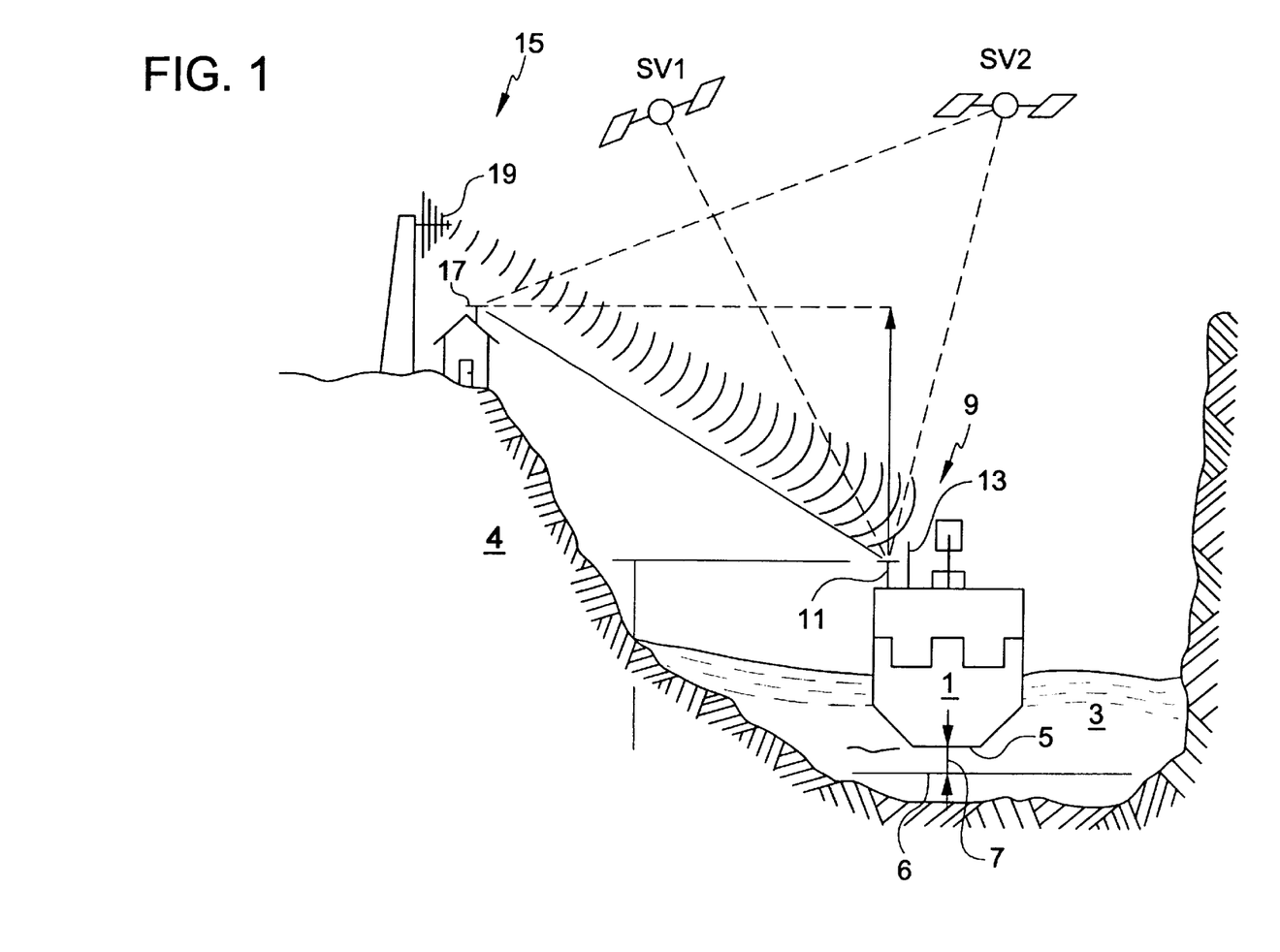
FIG. 1 is a cross sectional schematic view showing a ship in a channel and the parameters and components of interest.

FIG. 1 is a cross sectional schematic view showing a ship in a channel and the parameters and components of interest. No scale is used for any of the components or their perspective distances apart. A ship or vessel 1—the terms are used interchangeably herein—is positioned in a body of water or channel 3 located between the two spaced shorelines 4. The keel 5 of the ship has published channel depth keel clearance 7. In one embodiment, on the ship 1 there is a first GPS signal receiving system 9 with an antenna 11. Included in a system 9 is a radio signal receiver with an antenna 13. The system 9 also has a computer which permits vertical positions to be determined to within 0.15 feet accuracy using differential GPS (DGPS). To do so a second GPS signal receiving system 15 located on shore is used as a reference and has a second GPS antenna 17 and a radio transmit antenna 19. In FIG. 1, the two space vehicle (SVs) SV1 and SV2 represent two of the 24 earth orbiting satellites in the GPS. Each GPS space vehicle is in communication with the two GPS signal receiving antennas 11 and 17.

DESCRIPTION OF THE PREFERRED EMBODIMENT

FIG. 1 is a cross sectional schematic view showing a ship in a channel and the parameters and components of interest. No scale is used for any of the components or their respective distances apart. A ship or vessel 1—the terms are used interchangeability herein—is positioned in a body of water or channel 3 located between the two spaced shorelines 4. The keel 5 of the ship has a published channel depth keel clearance 7. On the ship 1 there is a first GPS signal receiving system 9 with an antenna 11. Included in system 9 is a radio signal receiver with an antenna 13. The system 9 also has a computer which permits vertical positions to be determined to within 0.15 feet accuracy using differential GPS (DGPS). To do so a second GPS signal receiving system 15 located on shore is used as a reference and has a second GPS antenna 17 and a radio transmit antenna 19. In FIG. 1, the two space vehicle (SV)s SV1 and SV2 represent two of the 24 earth orbiting satellites in the GPS. Each GPS space vehicle is in communication with the two GPS signal receiving antennas 11 and 17.

The vertical distance from the phase center of the ship's antenna 11 to the bottom of the ship's keel 5 is a constant predetermined known value. This value is to be subtracted from the ellipsoid height component of the ship's present position to give an elevation relative to the ellipsoid for the lowest point on the ship's keel.

The present position of the lowest point on the ship's keel is compared to a database of ellipsoid heights for the particular navigation channel of interest. The keel clearance is found by two-dimensional interpolation of the database given the ship's horizontal position to index four ellipsoid height values from the database computation of a height 6 under the ship. The difference in ellipsoid heights of values 5 and 6 provides the vertical clearance 7. If desired, the ship's database can be queried should the ship steer outside the channel to identify the event and then sound an alarm.

As an example referring to FIG. 1, consider a 50-foot navigation channel. If the present position of the ship's GPS phase center vertical ellipsoid component is −50.0 feet and the constant distance is 96.3 feet, then the elevation of the lowest point 5 on the ship's keel is −146.3 feet.

Figure 2:
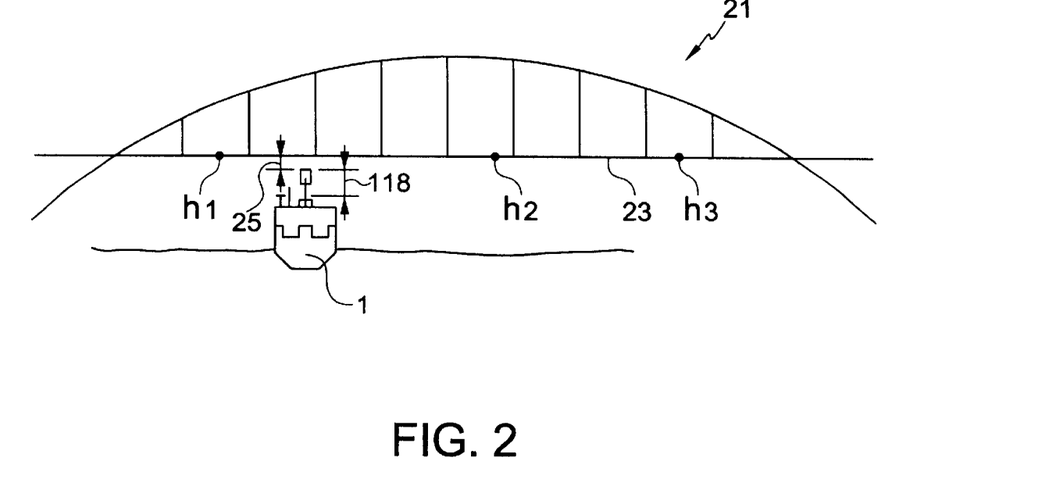
FIG. 2 is a schematic diagram showing a ship under a bridge with the water levels of interest.

FIG. 2 is a schematic diagram showing a ship 1 under a bridge 21 with the water levels of interest. The ship uppermost component should clear the bridge deck 23 by a desired clearance designated by the distance 25. Along the length of the bridge deck are three spaced points h1, h2 and h3 designating database indicators for the clearance 25. Since the bridge deck 23 may be in the shape of a concentric or parabolic bridge deck, 3 points (i.e., h1, h2 and h3) are needed. These concentric curves and parabolas are second order curves that require a minimum of three points to describe their geometries. A vessel's clearance from the ship's highest point to the underside of the bridge deck 23 can be computed from a database of a bridge information and the ship's present position through linear interpolation. The ship's horizontal position can be used to search the database and select the proper bridge coordinates for the interpolation. A new ellipsoid height is computed over the ship. The ellipsoid height component of the ship's present position and the constant height 118 above the GPS antenna to the highest point on the ship is then used to find the clearance. For example, if the ship's position height at the GPS antenna is now −50 feet in ellipsoid height and the ship's constant height is 20 feet, then the highest point on the ship has an ellipsoid height of −30 feet. If the interpolated position of the ship under the bridge deck is −26.5 feet along the underside of the bridge deck, then the clearance is 3.5 feet.

The port authority is responsible for finding the lowest bridge deck values, which can be change as a function of temperature (bridges can sag many feet). The bridge values are stored in a database for each port. The ship's owner is responsible for measuring the distance from the GPS antenna phase center to the top of the ship. The value is stored in the ship's exclusive database.

Figure 3:
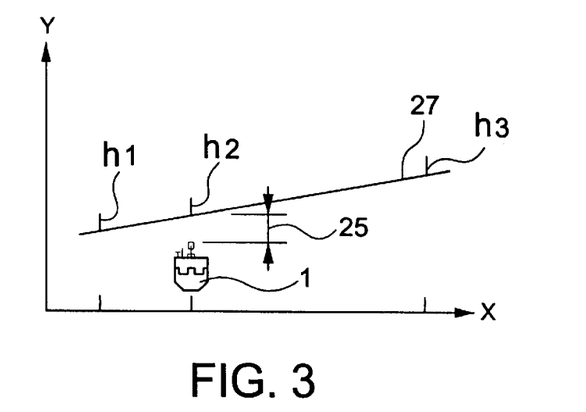
FIG. 3 is a schematic graph diagram showing bridge deck clearance.

FIG. 3 is a schematic graph diagram showing bridge deck clearance and is read in conjunction with FIG. 2. The straight line designated 27 represents the bridge deck 23. The distance below this line is shown by the distance 25 and the bridge clearance. The three spaced bars represents the bridge deck distances h1, h2 and h3. As shown by this figure the clearance distance 25 of the ship 1 varies depending on the ship's location below the bridge.

Figure 4:
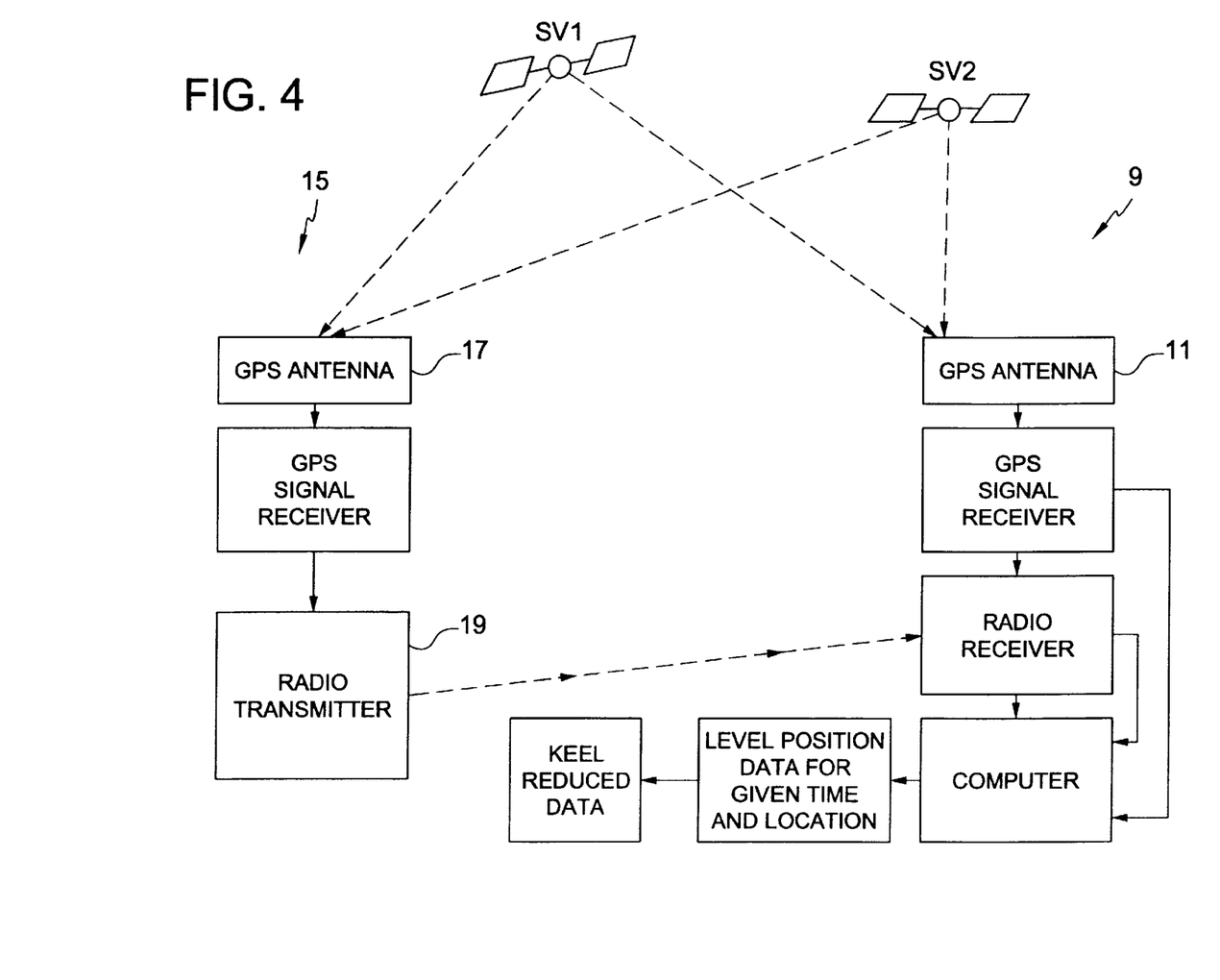
FIG. 4 is a block diagram showing the two GPS antenna systems and associated components.

FIG. 4 is a block diagram showing the two GPS signal receiving systems and their associated antennas and components. The same components with the same numbers used in FIG. 1 are also used in this figure. One GPS antenna 9 on board the vessel is in communication with the existing GPS satellite system above the earth represented by the notations SV1 and SV2. The second GPS signal receiving system 15 is a reference and has a GPS antenna 19 operatively connected to its own GPS receiver and a broadcast radio. The second radio transmitter is capable of transmitting a signal to a first radio receiver in the first GPS signal receiving system 9 located aboard the ship 1. The ship's first GPS signal receiving system 9 has its own interactive GPS signal receiver, and both a shipboard radio receiver and computer. As described previously, the data output from the ship's computer provides level position data for a given time and location. These data are then reduced to take into consideration the previously determined fixed distance 7.

All equipment hardware mentioned is conventional off-the-shelf state of the art design. In one working embodiment the following specific types of equipment were used: The GPS antenna 17 was an L1, L2 (dual frequency) geodetic quality antenna used for GPS reception. The L1 frequency was 1575.42 MHz and the L2 frequency was 1227.60 MHz which are the broadcast frequencies associated with GPS.

In the same embodiment, the GPS signal receiver 19 had at least a 12-channel GPS dual frequency receiver. The radio transmitter used in the same embodiment is commercially available and is a radio modem that converts digital information into a radio frequency (RF) communication burst that is demodulated by the radio receiver on board the vessel 1. The computer used is a personal computer capable of running Microsoft Windows operating systems and has a sufficient number of input/output ports for the ship's radio receiver and GPS receiver unit. Software can be purchased or coded by the user to read a grid and perform a two-dimensional interpolation based on the vessel's present horizontal position relative to a reference to obtain a refined grid value from nodes having known locations. The keel clearance is computed by subtracting from the ellipsoid height of the GPS antenna's phase center the distance from the phase center to the ship's keel 5. This value is compared to the data base elevation calculated by a two-dimensional interpretation of the ship's instant geographical position.

Using the present invention coupled with the existing acoustic transducers, pilots are provided with more information to help identify squat and settlement issues when the readings are increasing or decreasing at the same rate. This also shows dredging deeper than the published channel. Should the readings rate begin to differ, the bathymetry may be changing. Should the GPS clearance drop out while the GPS is operational, the ship has drifted outside the channel.

With a preferred embodiment of the present invention the published known channel depth is used in conjunction with other readings to compute an actual channel depth for a given channel location. This known and calculated information is then stored and visually displayed as the operator navigates through the channel. Once available, proper operation prevents a ship from running aground in a navigation channel as it enters from the open sea. Presently used methods to correct for variations in published channel depths usually require the conducting of new hydrographic surveys and marine consultant testimony for ship loading and velocity. Using the present invention no such new surveys are necessary and actual channel depth measurements are given every second between the ship's keel and the bottom of the published channel depth. Shoals (bathymetry extruding up through the channel surface) have their exact locations identified and recorded for future use.

Critical to the present invention is the use of the GPS. This GPS application requires the mapping of the nautical chart datum to the GPS ellipsoid model World Geodetic System 1984 (WGS 84) and the depth of the channel. The World Geodetic System of 1984 (WGS 84) is datum specified by the U.S. Department of Defense in 1984 using the earth's computed center of mass and other specified locations on the earth's surface. This system is independent of tidal datums such as the Lowest Astronomical Tide (LAT) used in the United Kingdom or the Mean Lower Low Water (MLLW) used in the United States. Once the chart datum is mapped to the GPS then the depth of the channel is the only other parameter of interest.

Figure 5:
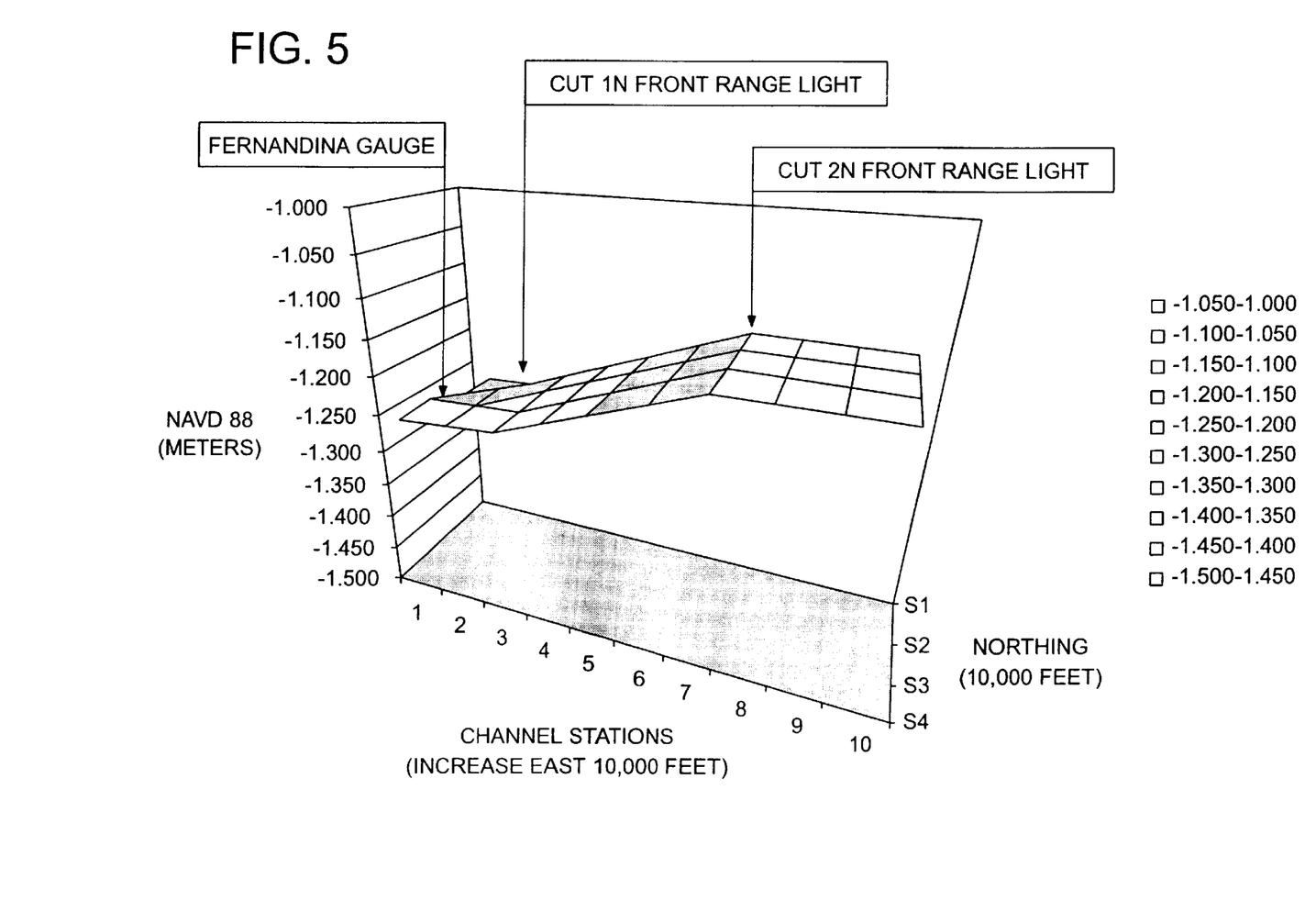
FIG. 5 is an example of a perspective traditional graph for a specific channel.

FIG. 5 is an example of a perspective traditional graph for a specific channel, in this case, Saint Mary's Entrance Channel to Kings Bay, Femandia, Fla. As shown, this figure is a traditional channel tidal datum diagram of the mean lower low water tide surface relative to the NAVD 88. NAVD 88 refers to the North American Vertical Datum of 1988 which is a national geodetic vertical datum for the United States developed by the National Geodetic Survey, National Oceanic and Atmospheric Administration, U.S. Department of Commerce. This national vertical adjustment is used by surveyors and engineers who undertake projects over large areas of the United States. FIG. 5 graphically shows how water flows though an ocean inlet. Dangerous currents drop the water levels as the water is channeled through this restricted space. It also illustrates how water behaves as we actually see the water react to forces on the earth. Low water events in the inlet in question are specifically shown by this graph.

Previous work has developed the use of the term GPS Tides. The term GPS Tides is a result of GPS heights reported as height below the GPS ellipsoid in lieu of orthometric height measurements above the earth's geoid (the earth's true shape or the mean sea level of the oceans). Traditional tide measurements are reported relative to an orthometric height network of vertical measurements (vertical datum). In the GPS Tide application, GPS ellipsoid heights are converted to orthometric heights for MLLW computations. If the resultant plots are acceptable, the orthometric heights are converted back to ellipsoid heights. A grid of GPS ellipsoid heights are then developed, which allow for the difference of GPS heights measured during any hydrographic survey, thus allowing display of the actual tide at the vessel's current position. More information on the underlying actual results employing the GPS Tides can be found in reports related to U.S. Pat. No. 6,256,585 B1, issued Jul. 3, 2001, to Shannon. A paper by the inventor entitled "GPS Tides, Saint Mary's Entrance Channel to Kings Bay, U.S. Army Corps of Engineers" was first published and presented on Dec. 4, 1998 at the International Symposium of Marine Positioning.

GPS Tides measures the water height above a fixed surface for hydrographic survey and dredging applications. GPS Tides can also measure a tide at a location in order to compute a point for construction of the fixed surface. Once the surface has been fixed it becomes a dredging reference. This particular fixed surface in the United States is called the Mean Lower Low Water (MLLW). A preferred embodiment of the present invention uses the same equipment and the same MLLW surface mapped to the GPS ellipsoid. A dredge or survey vessel calibrates their acoustic depth recorders to the sea surface. A deep draft vessel needs the measured distance from the GPS antenna phase center down to the bottom of the vessel's keel.

Within the next few years it is anticipated that many harbors will have the GPS reference land based stations available to use this technology. The GPS reference stations 15 having a GPS system and antenna 19 with a known position, an internal GPS receiver and a broadcast radio, can transmit to 12 nautical miles. For one embodiment of the invention, the ship 1 must have an operative geodetic quality GPS receiver, a computer and appropriate software. Further, the mariner's surveyor measured the distance from the ship's GPS antenna to the bottom of the ship's keel. The ship's squat(nautical term for a ship's attitude) in the water at different speeds and keel bending due to static and dynamic loads are recorded using the GPS Tides System. The known channel depth is loaded in the ship's computer as a function of the horizontal position with respect to a known GPS reference. During operation, the ship's horizontal position from the GPS unit will be used to compute the vertical position of the keel related to the channel depth. In the calculation process, the vertical component of the ship's GPS position located at the GPS antenna 11 will be subtracted from the ellipsoid elevation of the channel depth. From this height the height measured by the marine surveyors for the vessel will be subtracted. Finally, dynamic contributions from vessel speed and loadings will be factored to provide the clearance above the navigation channel depth, not the sea bottom.

Figure 6:
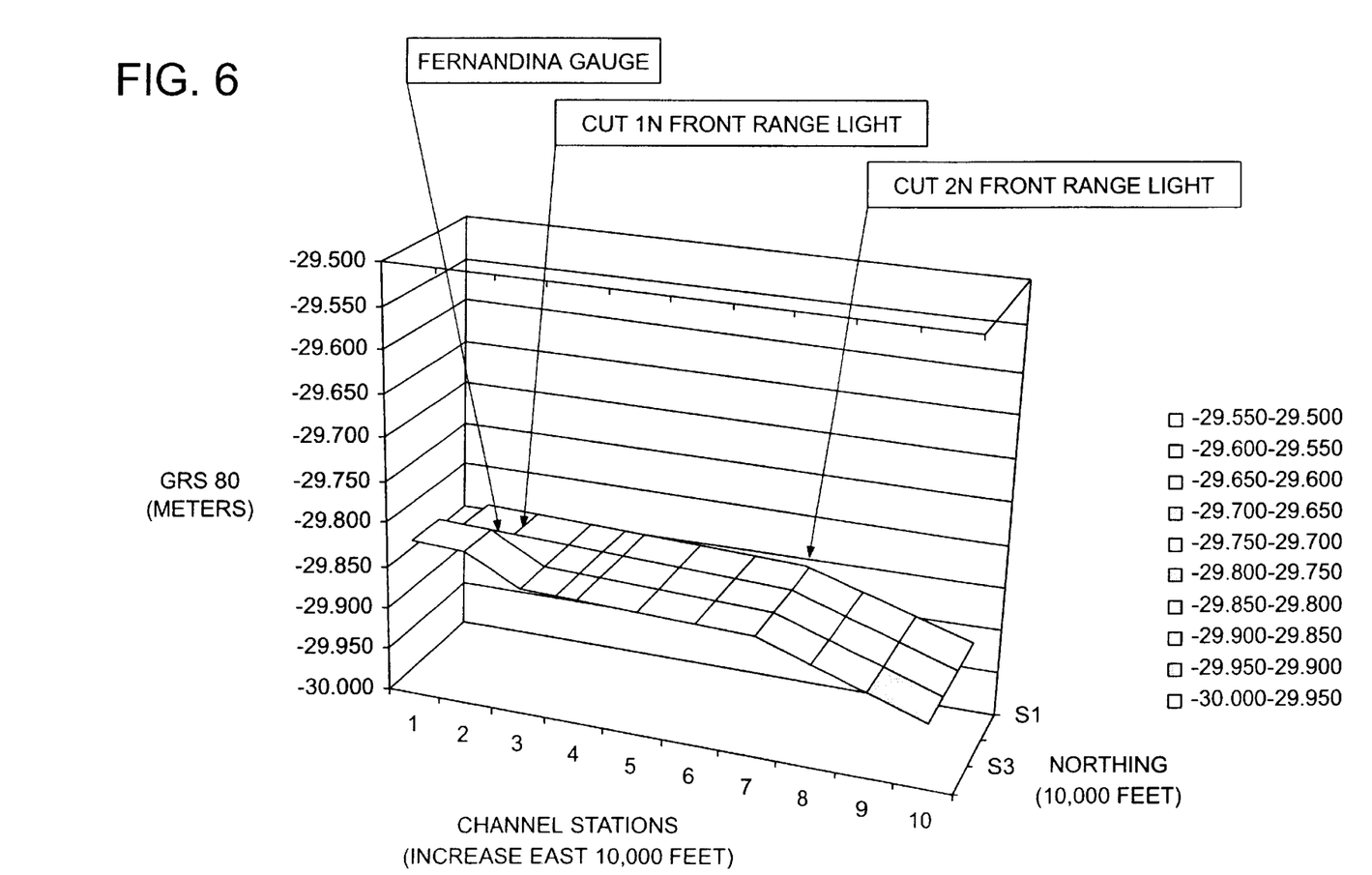
FIG. 6 is an example of a perspective graph for the same channel used in FIG. 5 with results derived using the present invention.

FIG. 6 is an example of a perspective graph for the same channel used in FIG. 5 with results derived using the present invention. FIG. 6 is the exact duplicate of FIG. 5 in a height system without forces such as gravity. The system is based on an ellipsoid of revolution. Specifically, the ellipsoid is the Geodetic Reference System of 1980 (GRS80). The geodetic reference is almost exactly like the Global Positioning System (GPS) reference, the World Geodetic Reference System of 1984 (WGS84). FIG. 6 is a database of ellipsoid heights for the Saint Mary's Entrance Channel and is stored in a computer aboard the Survey Vessel (SV) Florida, SV Florida. This vessel uses the database to measure the tide anywhere on the grid of FIG. 6. Should the database be altered by increasing the magnitude of the ellipsoid heights (the values are negative numbers), by a constant equal to the published channel depth of 46 feet then a new database would be created. This new database would be the collection of ellipsoid heights required to find the keel clearance below the ship to the published channel depth. The correct ellipsoid height from the database depends on the correct horizontal position of the vessel, because the values in the database are not constant. Once the correct ellipsoid height is interpolated in two dimensions from the grid nodes in the database to the ship's position, the ellipsoid height measured by the ship's GPS antenna can be used to find the keel clearance to provided the distance in FIGS. 1 and 2 is first used to increase the magnitude of the ship's GPS ellipsoid height for the event second (data are taken at one-second intervals). The final step is to compute the clearance by subtracting the larger negative number from the database an ellipsoid value computed down to the bottom of the ship's keel. The resultant is the keel clearance.

The advantage of the present invention is to change the vertical reference from the existing bathymetry to the reference below Mean Lower Low Water (MLLW) in the United States. Other countries may use a similar known low water reference; however, all waterborne navigation channels are dredged to a specific depth below the low water reference. In this fashion a minimum amount of water depth is guaranteed at all times regardless of the phase of the tide. The present invention displays the tide and the clearance of the ship's keel to the published dredged depth below the low water reference. Using this invention allows a responsible professional pilot to load more cargo on the ship and to safely guide the ship through the harbor to the open ocean.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What is claimed is:

1. A system for ascertaining height relative to at least one chart datum, comprising:
   at least one reference first GPS receiver, said reference first GPS receiver in operable communication with at least one GPS satellite transmitting at least one first signal containing GPS data;
   at least one first communications device at least transmitting at least one second signal containing GPS data received from said at least one reference first GPS receiver;
   at least one second GPS receiver, having at least one antenna having a known phase center and appurtenant to a vehicle having at least one extremity generally vertically oriented with respect to at least one horizontal plane represented by said at least one chart datum, said at least one second GPS receiver in operable communication with at least one GPS satellite for receiving said at least one first signal;
   at least one second communications device, appurtenant to said vehicle,
   for at least receiving said at least one second signal;
   at least one computer, having at least one input and at least one output, incorporating at least one database and having connecting paths to allow operable communication with said at least one second communications device, said at least one first GPS receiver and said at least one second GPS receiver; and
   at least one monitoring device for receiving at least one said at least one outputs from said computer,
   wherein, said database comprises vertical reference data in relation to said at least one chart datum for at least one horizontal position relative to said reference at least one GPS receiver,
   wherein, said at least one GPS satellite comprises at least four satellites each of which is transmitting at least one said at least one first signal, and
   wherein said GPS data are Real Time Kinematic (RTK) data that are carrier phase differential processed by said computer to provide an accurate record over time of the height of said at least one extremity relative to said at least one chart datum.

2. The system of claim 1 in which said first communications device is a transmitter compatible with said second communications device and said second communications device is a receiver, appurtenant to said vehicle and compatible with said first communications device.

3. The system of claim 2 in which said vehicle is a marine vessel having said computer appurtenant thereto,
   wherein said height is the height of water referenced to at least one chart datum in a navigable location, and
   wherein said computer provides at least one indication of said height of water in relation to at least one of said extremities.

4. A vehicle, having extremities, at least parts of which extremities extend in a generally vertical orientation with respect to a horizontal plane represented by at least one chart datum, and at least a part of a system for ascertaining height in relation to said chart datum, said system comprising:
   at least one reference first GPS receiver, said reference first GPS receiver in operable communication with at least one GPS satellite transmitting at least one first signal containing GPS data;
   at least one first communications device at least transmitting at least one second signal containing GPS data obtained from said at least one GPS satellite via said at least one reference first GPS receiver;
   at least one second GPS receiver, having at least one antenna having a known phase center and appurtenant to said vehicle, said at least one second GPS receiver in operable communication with at least one GPS satellite for receiving said at least one first signal;
   at least one second communications device, appurtenant to said vehicle, for at least receiving said at least one second signal; and
   at least one computer, having at least one input and at least one output, incorporating at least one database and having connecting paths to allow operable communication with said at least one second communications device, said at least one first GPS receiver and said at least one second GPS receiver; and
   at least one monitoring device for receiving at least one said at least one outputs from said computer,
   wherein, said database comprises vertical reference data in relation to said at least one chart datum for at least one horizontal position relative to said reference at least one GPS receiver,
   wherein, said at least one GPS satellite comprises at least four satellites each of which is transmitting at least one said at least one first signal, and
   wherein said GPS data are Real Time Kinematic (RTK) data that are carrier phase differential processed by said computer to provide an accurate record over time of the height of said at least one extremity relative to said at least one chart datum.

5. The vehicle of claim 4 in which said first communications device is a transmitter compatible with said second communications device and said second communications device is a receiver, appurtenant to said vehicle and compatible with said first communications device.

6. The vehicle of claim 4 in which said vehicle is a marine vessel, wherein said height is the height of water referenced to at least one chart datum in a navigable location.

7. A system for ascertaining height in relation to at least one chart datum, comprising:

at least one first GPS receiver having at least one antenna having a known phase center, said at least one first GPS receiver appurtenant to a vehicle having at least one extremity generally vertically oriented with respect to at least one horizontal plane represented by said at least one chart datum, and in operable communication with at least one GPS satellite;

at least one first communications device, appurtenant to said vehicle, for receiving at least one signal and transmitting at least said at least one first signal;

at least one reference second GPS receiver, said reference second GPS receiver in operable communication with at least one GPS satellite;

at least one second communications device at least receiving said at least one first signal containing GPS data obtained from said at least one GPS satellite via said at least one first GPS receiver;

at least one computer, incorporating at least one database and having connection paths to allow operable communication with said at least one second communications device and said at least one second GPS receiver; and at least one monitoring device, appurtenant to said vehicle, in operable communication at least with said at least one second communications device, wherein, said database comprises vertical reference data in relation to said at least one chart datum for at least one horizontal position relative to said reference at least one GPS receiver, wherein, said at least one GPS satellite comprises at least four satellites each of which is transmitting at least one said at least one first signal, and wherein said GPS data are Real Time Kinematic (RTK) data that are carrier phase differential processed by said computer to provide an accurate record over time of the height of said at least one extremity relative to said at least one chart datum.

8. The system of claim 7 in which said vehicle is a marine vessel and said computer is remote therefrom, said computer providing, via said first and second communications device, at least one indication of said height to said monitor, wherein said height is the height of water referenced to at least one chart datum in a navigable location.

9. The system of claim 7 in which said first communications device is a transmitter compatible with said second communications device and said second communications device is a receiver, appurtenant to said vehicle and compatible with said first communications device.

10. A vehicle, incorporating at least a part of a system for ascertaining height in relation to at least one chart datum, said system comprising:

a first GPS receiver located at a fixed reference position, said first GPS receiver in operable communication with at least one GPS satellite transmitting at least one first signal containing GPS data;

a first communications device at least transmitting at least one second signal containing GPS data obtained from said at least one GPS satellite via said first GPS receiver;

a second GPS receiver appurtenant to said vehicle, said second GPS receiver in operable communication with at least one GPS satellite, via at least one antenna having a known phase center, said at least one antenna appurtenant to said vehicle;

a second communications device appurtenant to said vehicle and at least receiving said at least one second signal; and a computer appurtenant to said vehicle, employing memory to incorporate at least one database and having connection paths to allow operable communication with said second communications device and said second GPS receiver, wherein, said database comprises vertical reference data in relation to said at least one chart datum for at least one horizontal position relative to said reference at least one GPS receiver, wherein, said at least one GPS satellite comprises at least four satellites each of which is transmitting at least one said at least one first signal, and wherein said GPS data are Real Time Kinematic (RTK) data that are carrier phase differential processed by said computer to provide an accurate record over time of the height of said at least one extremity relative to said at least one chart datum.

11. The vehicle of claim 10 in which said vehicle is a marine vessel, wherein said height is the height of water referenced to at least one chart datum in a navigable location.

12. The vehicle of claim 10 in which said first communications device is a transmitter for at least line-of-sight communications at a frequency compatible with said second communications device and said second communications device is a receiver for at least line-of-sight communications at a frequency compatible with said first communications device.

* * * * *